Dec. 27, 1960  J. F. WAYMOUTH ET AL  2,966,602
HIGH OUTPUT FLUORESCENT LAMP
Filed June 27, 1956  2 Sheets-Sheet 1

*INVENTORS*
JOHN F. WAYMOUTH
FRANCIS BITTER
BY Lawrence Burns
ATTORNEY

United States Patent Office 2,966,602
Patented Dec. 27, 1960

2,966,602

HIGH OUTPUT FLUORESCENT LAMP

John F. Waymouth, Marblehead, and Francis Bitter, Cambridge, Mass., assignors, by mesne assignments, to Sylvania Electric Products Inc., Wilmington, Del., a corporation of Delaware Filed June 27, 1956, Ser. No. 594,307

9 Claims. (Cl. 313—44)

This invention relates to low-pressure fluorescent electric discharge lamps, and to apparatus and methods for operating such lamps at high outputs with high efficiency.

Low pressure fluorescent lamps of high efficiency have been previously known, but the efficiency was obtained by operating the lamp at low current density and with the lamp operating at low temperature, such as about 40° C. The most popular lamp of that type was the well-known 40-watt lamp, in a tube 1½ inches in diameter and 48 inches long. Attempts to operate that lamp at 200 watts for example, reduced the efficiency to 34% of its optimum value, when the lamp was allowed to operate under the same ambient conditions. Under such conditions, the tube wall temperature rose to 95° C.

If the tube wall temperature were kept low, for example at about 45° C., by cooling the lamp, the efficiency at 200 watts would rise, but would still be only 47% of optimum, according to Forsythe and Adams in their book "Florescent and Other Electric Discharge Lamps" (Murray Hill Press, New York City, 1948 pp. 84–85). Forsythe and Adams conclude that "These data show that even for constant mercury pressure (constant wall temperature) in the tube, the extra current through the tube causes a marked drop in the efficiency of production of the 2537-A. radiation." The 2537 Angstrom radiation is, of course, the main excitation for the light-emitting phosphor in the fluorescent lamp.

Another long-time worker in the field of low pressure mercury lamps, L. J. Buttolph, in a recent article in Illuminating Engineering, the official journal of the Illuminating Engineering Society (p. 326, vol. 49, July 1954), states in speaking of low-pressure fluorescent lamps, that "Efficiency and very high output intensity are incompatible in such lamps."

It is clear, then, that the art regarded very high output and high efficiency as incompatible in low pressure fluorescent lamps. In fact, although fluorescent lamps have now been used commercially for at least 18 years, no such very high output lamps have previously been placed on the market. No 200-watt lamp, for example, has previously been marketed in the 48 inch long, 1½ inch diameter tube of the usual 40-watt lamp, nor even in a tube twice that long.

Accordingly, an object of the present invention is to produce a fluorescent lamp of very high output and high efficiency. This object is attained by operating a small portion of the lamp at low temperature and by using a gas filling other than the customary argon or krypton. The results are completely unexpected, because with our invention a 200-watt lamp in a 40-watt bulb can give an efficiency 80% as great as the optimum efficiency with 40 watts. Such an efficiency is far greater than the 47% obtained by Forsythe and Adams, for the same input to the same size lamp.

We have discovered, moreover, that our high efficiency can be obtained with the main tube wall temperature very hot, even at the 95° C. for which Forsythe and Adams obtained only 34% of optimum efficiency, provided that one very small region of the bulb is kept cool. The area of the cool region can be less than 1% of the area of the bulb, a cool spot only about 1/16 inch in diameter being generally sufficient. The entire light-emitting portion of the tube can run at high temperature, except for a small cooler area at the end of the bulb.

We have also discovered that the full time efficiency at high output cannot be obtained with the use of the customary argon or argon-krypton mixtures, but that neon or helium gas should be used. The pressure should be for example a pressure of about 1 mm. of mercury, if the lamp is to come to equilibrium quickly, particularly on the first starting.

The effect of neon and helium in increasing the efficiency of low-pressure fluorescent lamps was not previously known, and in fact the use of neon in the ordinary, low-output, fluorescent lamps was known to give a reduction in efficiency over that obtained from the use of argon in such lamps as shown by Meister and Heine (Illuminating Engineering, vol. XLVII, No. 7, March 1952, p. 162, Fig. 6).

In fact, the use of krypton was recommended by the earlier workers in the art, because krypton is one of the heaviest of the rare gases, and the heavier mass of the krypton atom gives a smaller average energy loss by electrons in collision with the atoms of the filling gas during the discharge. Moreover, the cross-section for elastic scattering by the neon and helium atoms is greater than for krypton or argon, resulting in a larger number of collisions per unit length and an increased total loss for that reason also.

The table below gives the atomic mass numbers and the number of collisions per unit length (with 1 E.V. electron) for the various rare gases, together with the ratio of the latter to the former.

| Gas | Atomic Mass Number, A | Collisions per unit length, Pc | Ratio, Pc/A |
|---|---|---|---|
| He | 4 | 17 | 4.25 |
| Ne | 20 | 5 | 0.250 |
| A | 40 | 3 | 0.075 |
| Kr | 83 | 4 | 0.048 |
| Xe | 130 | 7 | 0.054 |

Previous workers in the art, based on considerations of Pc/A as given in the above table, concluded that argon, krypton and xenon, especially the latter two, would give the lowest electron-scattering losses, and hence the highest efficiency.

The conclusions of the previous workers were in fact confirmed for low power inputs. However, we now find quite unexpectedly that at high power inputs neon and helium, previously considered to be the poorest gases of all to use, were actually the most effective and efficient. They actually reduce the rapid drop in efficiency which occurs with the other rare gases when the power input is increased.

We find also, that because of the small area of cooling required, the tube does not have to have water-cooling, nor forced air-cooling, but can be cooled by shielding the end of the lamp from the radiation from the discharge, or by placing a piece of metal in contact with the glass. The piece of metal can be a metal fin, or set of such fins, placed near the tube, preferably under it, because the space above will be heated by air currents rising from around the bulb. Metal louvres under the lamp in a fixture can be used as the cooling fins, if desired.

The metal should make contact with the tube at a spot which is somewhat removed from the region near an electrode, because the radiation from the latter would heat the glass and make the cooling more difficult to achieve.

The cooling can also be accomplished by shielding at least one end of the lamp from radiation, as shown in the application of Calvin Gungle, John F. Waymouth, and Francis Bitter, for a Very High Output Low Pressure Lamp, filed concurrently herewith. In that application heat shields are used between an end of the lamp and the cathode at that end. The advantage of using neon or helium gas at low pressure can also be obtained with such a method of cooling, and with other methods.

We have discovered that the desired high efficiency at high output can be obtained without the need for any enlargements or protuberances in the glass tube itself, and that the tube can consequently be of substantially uniform diameter from end to end. The tube will therefore be free-rolling and suitable for use with mass production machinery.

Other objects, features and advantages of the invention will be apparent from the following specification, taken in connection with the accompanying drawings, in which.

Figure 1:
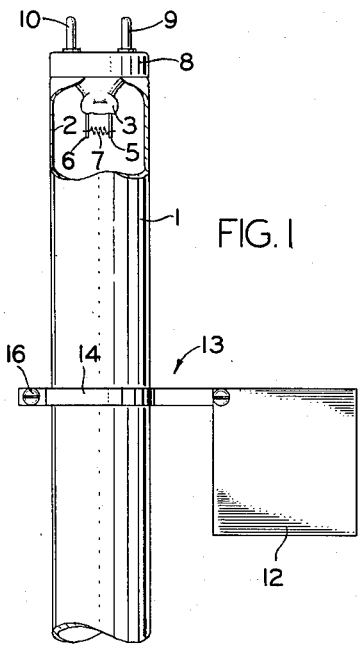
Figure 1 is a longitudinal side view partly in section of a lamp according to an embodiment of the invention.
Figure 2:
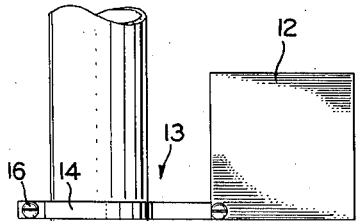
Figure 2 is an end view of such a lamp.
Figure 2:
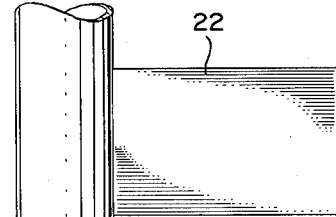
Figure 2:
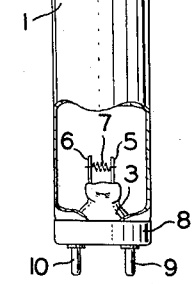
Figure 2:
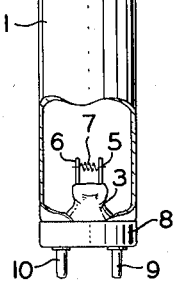
Figure 2:
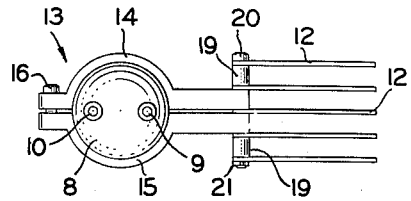

In Figures 1 and 2, the lamp shown is a glass envelope 1 with a phosphor coating 2 on its interior surface. Each end of the envelope 1 is closed by a stem 3 sealed thereto and having a stem press through which lead-in wires 5, 6 are sealed. A filamentary electrode 7 is connected at each of its ends to one of said lead-in wires 5, 6 and comprises a coiled-coil of tungsten wire, carrying an electron-emissive coating of the alkaline earth oxides, for example, barium, strontium and calcium oxides, preferably applied as in U.S. Patent 2,530,394, to E. F. Lowry et al., and containing a small percentage, say about 5% of zirconium dioxide, as in that application. A triply-coiled cathode, as in many present day lamps, can be used instead of the coiled-coil if desired, or some other form of electrode can be used.

To facilitate the making of electrical connections, a base 8 is affixed to each end of the lamp and contains metal contact prongs 9, 10 attached to lead-in wires 5, 6.

The sealed envelope 1 contains a filing of neon gas, preferably at about 1 mm. pressure, and a drop of mercury to provide mercury vapor. The neon gas preferably contains a small amount of argon, for example 0.1% by volume, to facilitate starting of the lamp.

A set 11 of metal cooling fins 12, 12 is attached to the split ring 13, the two halves 14, 15 of which are tightened around the tubular envelope 1 by the headed screw 16, which fits into threads in half-ring 15. The fins 12 are spaced apart by washers 19. A screw 20 passes through the stacked fins and washers and is held thereto by a nut 21. Although the fins 12 are shown parallel to the envelope 1, they can be transverse to it, or at an angle to it, if desired.

Figure 3:
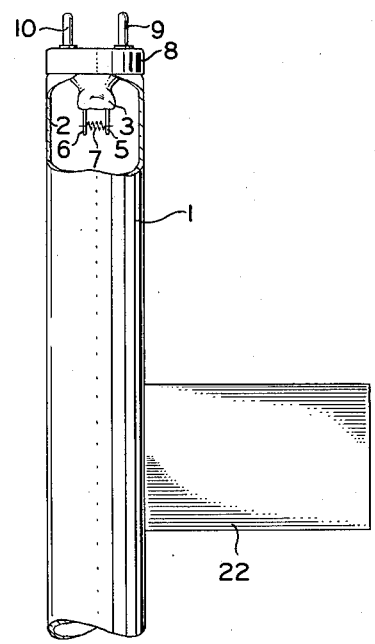
Figure 3 is a longitudinal side view of another embodiment.

In Figure 3, the lamp is as described for Figs. 1 and 2, but each set 11 of fins 12 is replaced by a single larger fin 22, which is cemented or sealed directly to the envelope 1.

When the lamp was operated at 200 watts input in still air of 80° F. temperature, the fins were found to be about 20° to 30° C. cooler than the remainder of the tubular portion of the lamp. The mercury was observed to condense in a narrow line on the inside surface of the glass envelope 1 immediately above the line of contact of each vane with said envelope.

The light output was 81.3 arbitrary linear units, whereas without the fins the light output was only about 60 to 65 units on the same scale. By making the fins slightly larger, the light output could be brought up to a maximum value of 89 units.

Instead of using a fin as above, some part of the fixture, in which the lamp is used, such as a metallic louvre or set of louvres, or some other form of "heat sink," can be placed in thermally-conductive contact with the lamp envelope. Moreover, contact between the fins, louvres, or other heat-sink, and the envelope 1 can be made through a thermally-responsive bimetal strip, so that a fixed temperature could be maintained despite large fluctuations in ambient temperature. The bimetal would contact the envelope until the bimetal cooled enough to deflect away from the lamp. While the lamp heated up slightly, the bimetal would also heat up and again contact the lamp to cool it.

Figure 4:
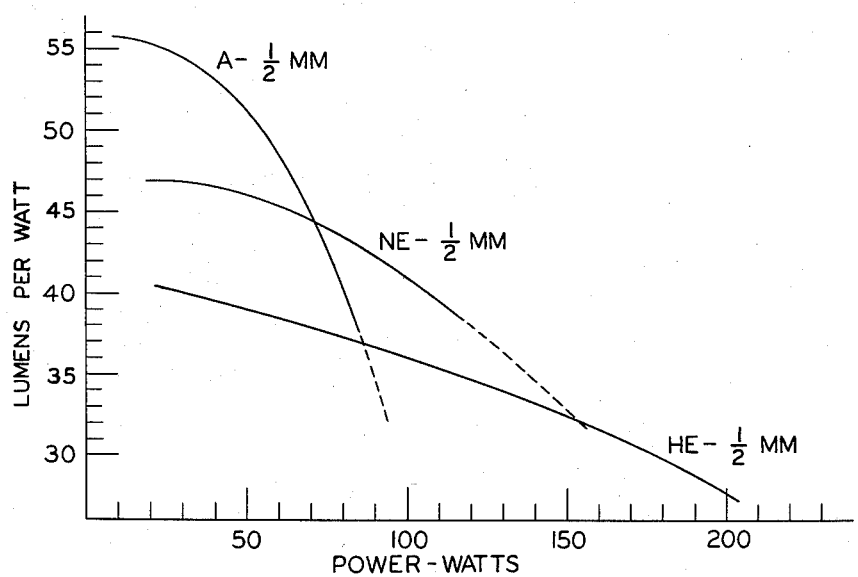
Figure 4 is a graph of efficiency vs. power input for a lamp of the "20-watt" tube size, with various gas fillings.

In Figure 4, the effect of various filling gases is shown at a pressure of about ½ mm. of mercury. The curves are for a so-called "20-watt" fluorescent lamp operated at various inputs. The lamp tube was 1½ inch in diameter and 24 inches long.

The graphs show that up to about 70 watts input, argon gas gives the highest efficiency, that between 70 watts and 150 watts, neon gives the highest efficiency, and that above 150 watts helium gives highest efficiency. At 100 watts input, neon gives about 35% greater light output than argon.

Figure 5:
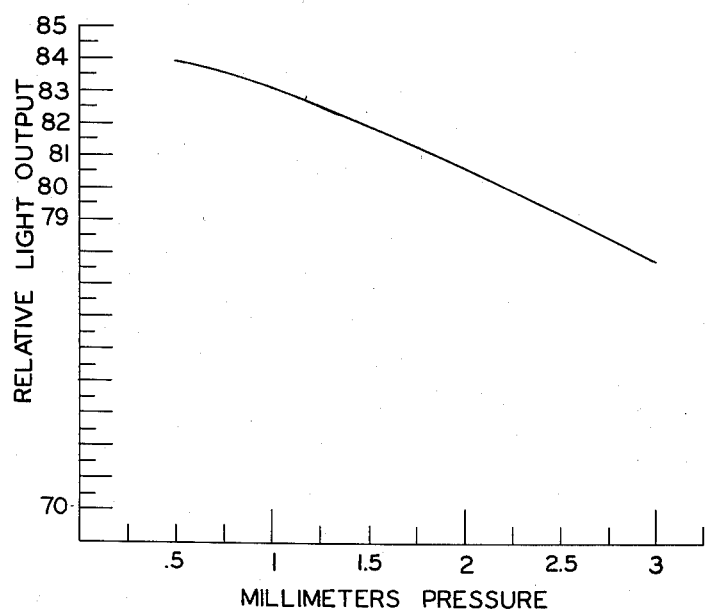
Figure 5 is a graph of light output vs. pressure of fill gas.

The variation in light output with pressure, for a constant 200 watt input to a lamp of 40-watt size with cooling vanes, is shown in Figure 5. Pressures of 0.5 mm. of mercury give highest output, but the lamp life will be reduced at such low pressures, so a pressure of about 1 or 1½ mms. is best, because it gives reasonable life, with less blackening of the ends of the lamp, and still gives a somewhat greater light output than would be obtained at arong with ½ mm. pressure. Such a low pressure of argon would give very short life.

The addition of a small amount of argon to the neon facilitates the starting of the lamp, that it permits starting at lower voltages, without appreciably reducing the efficiency of light output. About 0.1% of argon by volume of neon, is satisfactory, although the amount can be varied from about 0.04% to about 0.2%.

A lamp such as described above, in the usual "40-watt" tubular glass envelope 48 inches long and 1½ inches in diameter, with a cooling vane or vanes attached, will give an efficiency of about 50 lumens per watt at 200 watts input in an ambient temperature of 80° F., thereby giving 10,000 lumens total light output. That would be about 2500 lumens per foot, or on a power basis, 50 watts per foot.

For light outputs of about 1700 lumens per foot to 2700 lumens per foot in a 1½ inch diameter bulb, that is for power loading of about 20 watts per foot to 75 watts per foot in such a bulb, neon is the most efficient filling gas; for higher light outputs helium is more efficient. Mixtures of helium and neon can also be used.

Although we have described the use of neon, helium and mixtures thereof, with respect to a vane-cooled lamp, the advantages of such a gas filling can also be obtained in lamps where the low mercury pressure is obtained in other manners, for example, by using the mercury in the form of an amalgam, for example an amalgam of cadmium and silver, or by shielding the end of the lamp behind the cathode, as described in a copending application filed concurrently herewith by Calvin Gungle, John F. Waymouth and Francis Bitter.

The particular embodiments herein described have been given by way of example and not by way of limitation, and various modifications will be apparent to a person skilled in the art, without departing from the spirit and scope of the invention.

If a lamp is made according to the invention, but having a tube 1½ inches in diameter and 96 inches long, with a 200-watt input, the efficiency can be as high as 60 lumens per watt. Such a lamp will give about twice as much light as any other present 96-inch fluorescent lamp, and at the high efficiency just stated.

What we claim is:

1. A low pressure mercury discharge lamp comprising a light-transmitting envelope, electrodes sealed through each end thereof, a filling of inert gas therein, a quantity of mercury therein, and a mass of metal in thermally-conductive contact with said envelope at a small region thereof spaced substantially from each of said electrodes for cooling the region to keep the mercury vapor pressure between 4 and 10 microns.

2. A low pressure mercury discharge lamp comprising a light-transmitting envelope, electrodes sealed through each end thereof, a filling of inert gas therein, a quantity of mercury therein, and a mass of metal in thermally-conductive contact with said envelope at a small region thereof spaced substantially from each of said electrodes for cooling the region to a temperature of about 40° C. to keep the mercury vapor pressure between 4 and 10 microns.

3. A low pressure mercury discharge lamp comprising a light-transmitting envelope, electrodes sealed through each end thereof, a filling of inert gas therein, and at least one metal cooling vane attached to said envelope, said vane being in a plane through the longitudinal axis of the envelope.

4. The combination of claim 3, in which the inert gas is selected from the group consisting of helium and neon.

5. The combination of claim 3, in which the inert gas is selected from the group consisting of helium and neon, and is at a pressure between about one-half millimeter and about two millimeters of mercury.

6. The combination of claim 5, in which the envelope is of substantially the same diameter throughout its length.

7. A low-pressure mercury discharge lamp comprising a substantially tubular light-transmitting envelope, electrodes sealed at each end thereof, a quantity of mercury therein, a filling of an inert gas therein, said gas being selected from the group consisting of helium and neon, and means for operating said lamp at a power loading of at least 20 watts per linear foot of said tubular envelope, and means for cooling a small portion only of said envelope, to a temperature of about 40° C. to keep the mercury vapor pressure between about 4 and about 10 microns.

8. The combination of claim 7, in which the envelope is of substantially the same diameter throughout its length.

9. A low-pressure mercury discharge lamp comprising a substantially tubular light-transmitting envelope, electrodes sealed at each end thereof, fluorescent material on the inside of said envelope, a quantity of mercury in said envelope, a filling of neon gas therein, and means for operating said lamp at a power loading of between about 20 watts and 75 watts per linear foot of said tubular envelope.

References Cited in the file of this patent

UNITED STATES PATENTS

| | | |
|---|---|---|
| 1,151,129 | Skaupy | Aug. 24, 1915 |
| 1,897,586 | Pirani | Feb. 14, 1933 |
| 1,924,368 | McCullough | Aug. 29, 1933 |
| 2,262,177 | Germer | Nov. 11, 1944 |
| 2,452,518 | Burns | Oct. 26, 1948 |
| 2,622,221 | Beese | Dec. 16, 1952 |